(No Model.)

A. MENDEL.
HARNESS.

No. 477,378. Patented June 21, 1892.

Witnesses
Chas. H. Smith
Harold Serrell

Inventor
Alfred Mendel
per Lemuel W. Serrell
Atty

UNITED STATES PATENT OFFICE.

ALFRED MENDEL, OF STREHLEN, NEAR DRESDEN, GERMANY.

HARNESS.

SPECIFICATION forming part of Letters Patent No. 477,378, dated June 21, 1892.

Application filed May 25, 1891. Serial No. 393,969. (No model.)

*To all whom it may concern:*

Be it known that I, ALFRED MENDEL, a subject of the King of Saxony, residing at Strehlen, near Dresden, Saxony, German Empire, have invented certain new and useful Improvements in Harness for Horses, of which the following is a specification.

This improvement in harness is mainly intended for a pair of horses to carriages and vehicles for transporting goods for artillery, &c., and is intended to be used in connection with the improvement in collars for horses patented by me March 18, 1890, No. 423,566. The improvement in harness may, however, be used with all harnesses in which a pad, a saddle, or a saddle-like carrier on the back of the horse is employed.

With the harness according to this invention the straps or chains may be dispensed with, which are generally jingling in front of the horses, connected to the collar and to the front end of the beam or pole of the carriage, serving for steering the vehicle and to hold it back. Of course I do not dispense with the action of steering and holding back in my improved harness.

Figure 1:
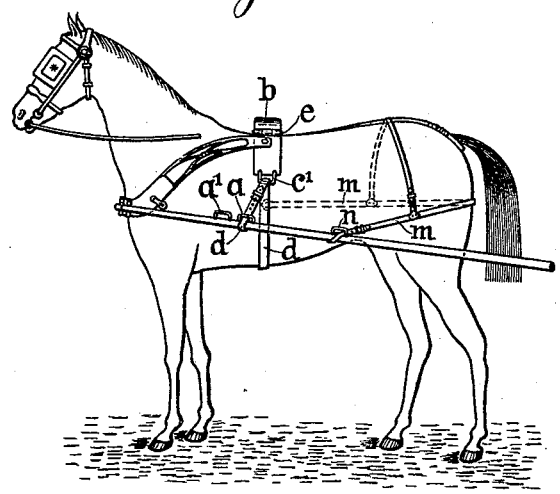
Figure 2:
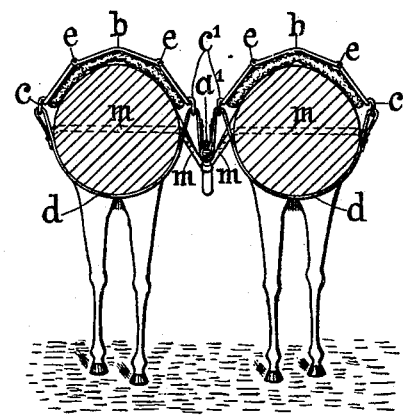

In the drawings, Figure 1 is an elevation, and Fig. 2 a cross-section, illustrating my invention.

For connecting the harness to the beam or pole I provide the latter with eyes or sockets $a\ a'$, which, if made of metal, are not fixed at the sides of the beam or pole, so that they would be inconvenient to the horses, but they are fixed at the upper or lower surface of the beam or pole. The pad or saddle $b$ on the back of the horse is provided at both sides of the horse with ring hooks or eyes $c\ c'$. Into the ring hook or eye $c$ of the pad or saddle, at the outer side of the horse, a strap, rope, or similar object $d$ is fastened in any convenient manner, which strap is led around the horse underneath and is then taken through the eye or ring $c'$ of the pad at the inner side of the horse, the said strap being introduced through the eye or ring $c'$ from the horse's side and then fixed to the beam or pole by means of the eye or socket $a$. A similar strap $d$ is fastened to the outside of the second horse in the ring hook or eye $c$, taken around beneath the horse's belly through the inner eye or ring $c'$, and fixed to the beam or shaft by another socket or eye $a'$.

It is evident that any pressure exerted by the straps $d$, hanging each in an eye ring or hook $c'$ and $c$ on both sides of the pad, will be a vertical pressure on the horse's back, which pressure will be the better distributed the more equally the pad or saddle rests on the horse's back. The bearing of the pad on the horse's back is generally such that the middle part does not touch the horse's back, but forms over the horse's spine a hollow space, called the "chamber." I avail myself or I maintain this system of the hollow chamber of the pad; but in order to secure a more exact position of the pad to the horse's back and to better accommodate the pad to the different shapes of horses' backs I provide the pad with the hinges $e$, one at each side of the middle and in a horizontal position.

With the above-named vertical strain or pull of the straps $d\ d$ on the pad the movable part of the latter will accommodate with accuracy the back parts of the horse, thus rendering any pull, strain, or pressure more easy on the horse.

By the movable side parts of the pad the latter is enabled to slightly change its position according to the movement of the horse. The pressure of the pad on the horse's back is exerted near where the hinges $e$ are placed, and these parts do not press direct on the horse's back, but by means of cushions.

By the aforedescribed arrangement any one-side pressure on the back is avoided or annihilated.

If breechings such as indicated at $m$ are used in connection with the above harness, the same are fixed at the outer side of the horse to the strap $d$ or to the rope or cord or direct to the collar, whereas at the inner side of the horse the breechings are fixed to the shaft or beam by means of an eye or socket $n$. The horse thus harnessed gains two points of support for stopping or holding back—one by the strap $d$, acting as steering and holding strap, and one by the breeching, both acting on the beam or shaft—whereas with the harness hitherto in use only one point of support acting on the beam or shaft was existing—to wit, the chain or strap in front of the horse between the collar and front end of the beam or shaft.

The new improvement in harness as above specified allows of materially shortening the beam or shaft, as this formerly had to protrude beyond the horse-collars of the pair for the fastening of the back chain or strap for obtaining the desired effect. With the improved harness the beam or pole may end between the horses, or, still better, it may be bent upward or downward at the front end.

With this improved harness ropes may be fixed in the ordinary manner to the collar and to the tree-bars.

I claim as my invention—

1. The combination, in a harness, of a saddle made in three pieces hinged together at points about midway between the center and ends of said saddle, rings or eyes at the respective ends of the saddle, and a strap through said rings and adapted to pass around beneath the belly of the animal and to be connected to the shaft or pole to support the same and simultaneously hold the saddle in place, substantially as set forth.

2. The combination, in a harness, of a saddle made in three pieces hinged together at points about midway between the center and ends of said saddle, rings or eyes at the respective ends of the saddle, a strap through said rings and adapted to pass around beneath the belly of the animal, said strap being connected to the shaft or pole to support the same and simultaneously hold the saddle in place, and a breeching-strap extending from the shaft or pole around behind the animal to the said strap near its attachment to the saddle, substantially as set forth.

In testimony that I claim the foregoing as my invention I have signed my name in presence of two subscribing witnesses.

ALFRED MENDEL.

Witnesses:
   WILHELM WIESENHÜTTER,
   CARL HEINRICH KNOOP.